United States Patent Office 3,202,472
Patented Aug. 24, 1965

3,202,472
PROCESS FOR PREPARING EVEN DYEINGS ON CELLULOSE MATERIALS IN A LONG BATH
Edwin Baier, Frankfurt am Main, Germany, assignor to Farbwerke Hoechst Aktiengesellschaft vormals Meister Lucius & Brüning, Frankfurt am Main, Germany, a corporation of Germany
No Drawing. Filed Oct. 1, 1963, Ser. No. 312,876
Claims priority, application Germany, Oct. 3, 1962, F 37,954
1 Claim. (Cl. 8—54.2)

It is known that on dyeing cellulose fibers in a long bath with water-soluble dyestuffs, for example direct dyestuffs or reactive dyestuffs, considerable quantities of sodium chloride or Glauber's salt must be used in order that the dyestuffs is well absorbed by the fiber. In many cases, however, the afore-mentioned dyestuffs yield even dyeings only if special leveling auxiliary agents are used simultaneously.

Now, we have found that even dyeings on materials of natural or regenerated cellulose can also be obtained in a long bath without the addition of salts and leveling auxiliary agents by dyeing said material in a dilute weakly acid aqueous solution at a temperature between about 20° C. and 100° C. with water-soluble organic dyestuffs free from anionic groups and containing tertiary or quaternary ammonium groups, pyridinium groups, ternary sulfonium groups or isothiuronium groups which are linked to the aromatic nucleus of the dyestuff molecules through bridge members of the general formula —A—R—, in which R represents a saturated or unsaturated aliphatic or aliphatic-aromatic radical which may be interrupted by one of several hetero-atoms, and A reprsents the group —SO$_2$— or —SO$_2$—N—R'—, (R' stands of a hydrogen atom or an alkyl or aralkyl radical); and, if desired, by subsequently fixing them fast to washing by a treatment with acid-binding agents, advantageously in an aqueous bath at about 40° C. to 100° C.

According to this method dyestuffs of an analogous constitution which contain anionic groups instead of the afore-mentioned cationic groups, are not absorbed by cellulose fibers.

Even dyeings are obtained on dyeing cellulose materials with the dyestuffs of the following Formulae 1, 2 and 3.

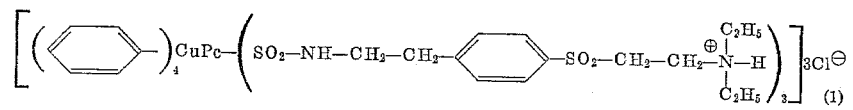

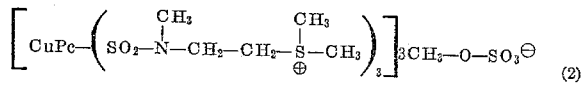

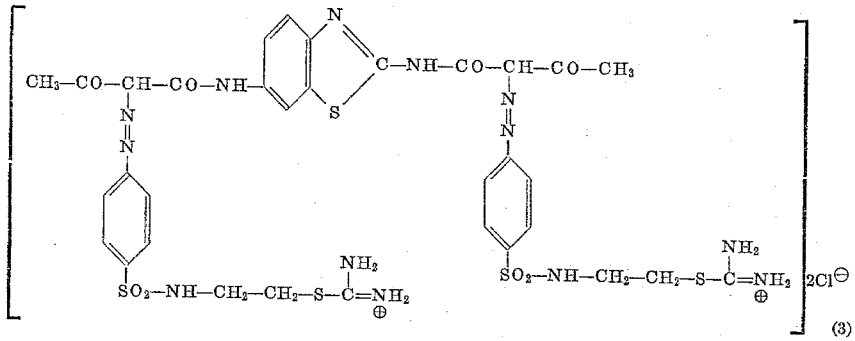

in a weakly acid solution without the addition of levelling auxiliary agents. The dyestuffs are absorbed by the cellulose materials without addition of salts, whereas the corresponding anionic dyestuffs of the following Formulae 4, 5 and 6

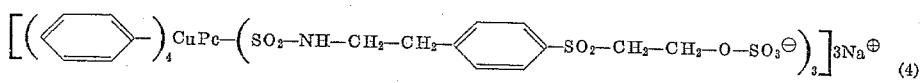

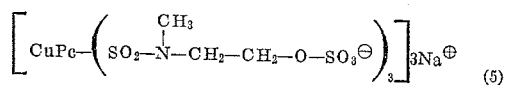

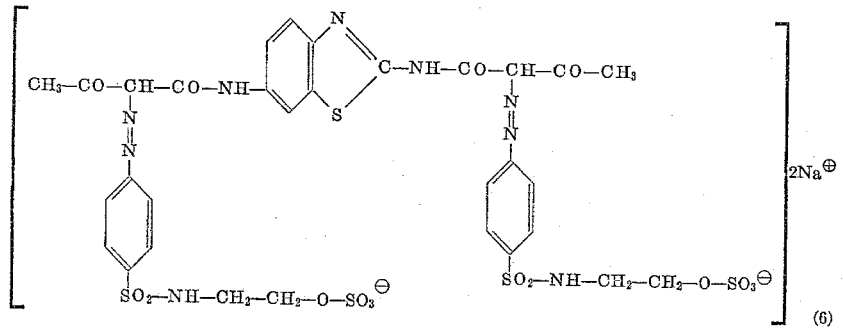

practically do not dye the cellulose under the same conditions and yield weak dyeings in a long both only with the addition of large quantities of salts.

It was surprising that the cationic dyestuffs (1) to (3), prepared according to simple manufacturing methods from the anionic dyestuffs (4) to (6) having a poor affinity, yield deep dyeings on cellulose material in a long bath without addition of salts, which dyeings, effected in a weakly acid medium, are simultaneouly very even.

The dyestuffs used may belong to quite different classes, for example to the series of phthalocyanine-dyestuffs, azodyestuffs or thiazol-dyestuffs which contain the aforementioned cationic groups. Such dyestuffs can be prepared, for example, by sulfochlorinating the water-insoluble starting dyestuffs at the aromatic rings, condensing the so obtained dyestuff sulfochlorides with amines of the general formula H$_2$N—R—X (R represents an aliphatic, aromatic or mixed aliphatic-aromatic radical which may be interrupted by hetero-atoms, and X represents an organic or inorganic acid radical), and reacting the so prepared ester compounds, which are free from sulfonic acid groups, (a) with primary or secondary amines or mercaptans and converting the so obtained secondary or tertiary amines or thio-ethers by a treatment with acids or dimethyl sulfate into the corresponding tertiary or quaternary ammonium compounds or ternary sulfonium compounds, or (b) with thiourea or its derivatives into the isothiuronium compounds, or (c) with pyridine into the pyridinium compounds, or (d) with tertiary amines into the quaternary ammonium compounds.

One can also operate in an analogous manner by reacting dyestuff esters, containing one or several β-hydroxyethyl sulfonic ester groups, according to the afore-mentioned methods of (a), (b), (c) and (d).

The dyebath is rendered weakly acid, for example, with acetic acid, in order to reduce the affinity for the cellulose and to provide a slow, even absorption of the dyestuff. The necessary dyeing temperature may vary in wide limits, for example in the range of about 20° C. to 100° C. and must be regulated according to the dyestuff used. The necessary quantity of acid also depends on the dyestuff used, since the affinity for cotton varies for the various dyestuffs and is differently influenced by acids.

The fastness to water of the dyeings, prepared according to the present invention by dyeing the material in a long bath, is very good. The fastness to washing of the dyeings prepared according to the present invention can be improved by subjecting the dyeings to an after-treatment with acid-binding agents, preferably with an aqueous solution of an alkali metal, for example sodium carbonate, sodium bicarbonate or tri-sodium phosphate at temperatures in the range of about 40° C. and 100° C., preferably at the boiling temperature.

In the cases in which the dyestuff and the acid-binding agent do not react in such a way that precipitations appear in the dyebath or that the dyebath is exhausted quantitatively, dyeing and fixing the material until it is fast to washing can also be carried through in one bath.

The following examples serve to illustrate the invention, but they are not intended to limit it thereto, the parts and percentages being by weight unless otherwise stated and the relationship of parts by weight to parts by volume being the same as that of the kilogram to the liter.

*Example 1*

10 parts of a cotton yarn are treated for 10 minutes at room temperature in 300 parts by volume of an aqueous solution containing per liter 1 gram of acetic acid (of 30% strength). Within 10 minutes 0.05 part of acetic acid (of 30% strength) and 0.1 part of the dyestuff of the formula

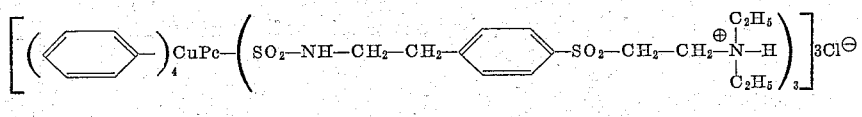

(prepared by the sulfochlorination of tetraphenyl-copper-phthalocyanine, condensation of the so obtained tetraphenyl-copper-phthalocyanine trisulfonic acid chloride with 1-amino-ethyl-benzene-4-β-hydroxyethylsulfone sulfuric acid ester and reaction of the so prepared condensation product with diethyl amine and subsequently with hydrochloric acid) dissolved in 10 parts by volume of water are then added in portions to the aforementioned solution. Within 45 minutes the dyebath is slowly heated to the boiling temperature, the yarn is then treated for 10 minutes at this temperature. It is subsequently rinsed in the heat and in the cold and fiinally treated for 1 hour at the boiling temperature in a sodium carbonate solution of 3% strength.

An even green dyeing, possessing a very food fastness to wet processing, is obtained.

*Example 2*

A cotton fabric is dyed according to the method described in Example 1 with the dyestuff of the formula

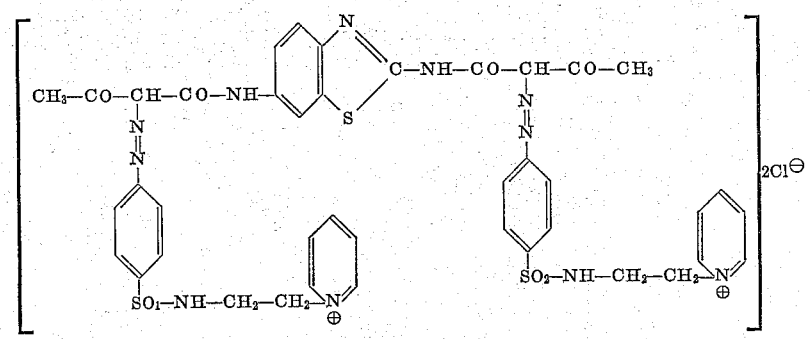

(prepared by the coupling of 2 mols of diazotized 4-amino-benzenesulfonyl-aminoethyl chloride with 1 mol of 2,6-bis-(aceto-acetylamino)-benzthiazol and subsequent reaction with pyridine).

A very even yellow dyeing is obtained.

*Example 3*

10 parts of a cotton yarn are introduced into 500 parts by volume of an aqueous solution containing 0.15 part of acetic acid (of 30% strength) and 0.2 part of the dyestuff of the formula

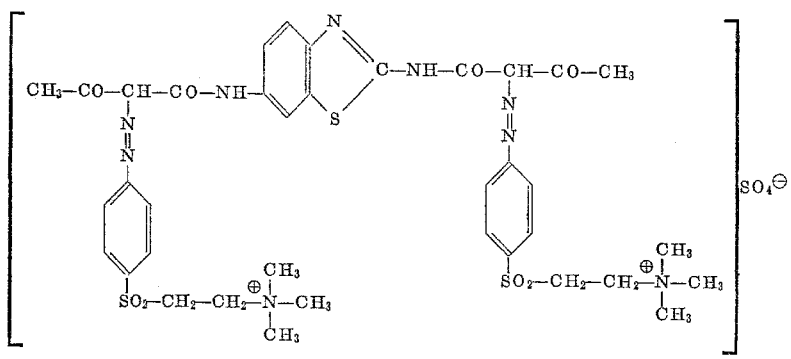

(prepared by coupling 2 mols of diazotized 4-aminobenzene-ethylsulfone-β-trimethylammoniumsulfate with 1 mol of 2,6-bis-(acetoacetylamino)-benzthiazol; 4-aminobenzene-ethylsulfone-β-trimethylammoniumsulfate can be obtained by reacting 4-aminobenzene-β-hydroxyethyl-sulfone-sulfuric acid ester with trimethyl amine).

The dyebath is heated at 60° C. within 30 minutes and the yarn is dyed at this temperature for 1 hour. It is then rinsed and treated at the boil for 1 hour with a sodium carbonate solution of 2% strength. It is then rinsed, acidified, rinsed again and dried.

An even yellow dyeing of a good fastness to washing is obtained.

*Example 4*

10 parts of a cotton fabric are introduced into 500 parts by volume of an aqueous solution containing 0.2 part of acetic acid (of 30% strength) and 0.2 part of the dyestuff of the formula

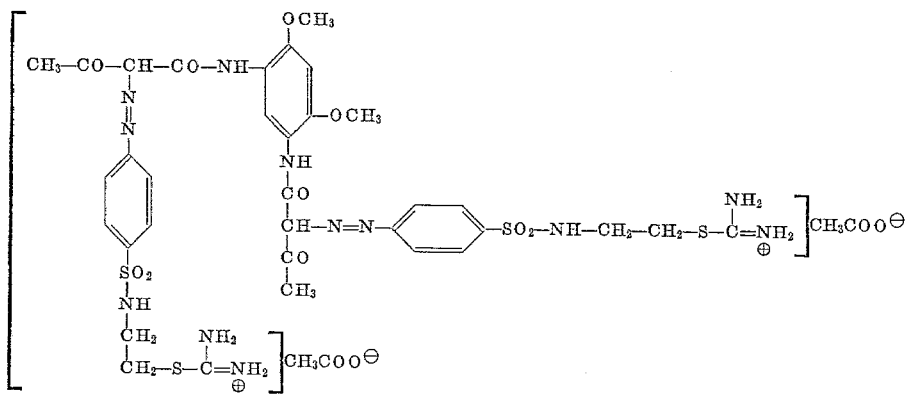

(prepared by coupling 2 mols of diazotized 4-aminobenzene-sulfonyl-aminoethyl-isothiuronium chloride with 1 mol of 1,5 - bis - (acetoacetylamino)-2,4-dimethoxybenzene).

The dyebath is heated within 30 minutes at 60° C. and the fabric is dyed for 1 hour at that temperature, 0.6 part of sodium acetate solution of 10% strength being added in portions at intervals of 10 minutes each.

An even yellow dyeing is obtained which can be improved with regard to its fastness to washing by an aftertreatment at the boil with a sodium carbonate solution of 2% strength.

*Example 5*

10 parts of a staple fiber fabric are treated for 1 hour at 80° C. in 200 parts by volume of an aqueous solution containing 0.1 part of acetic acid (of 30% strength) and 0.3 part of the dyestuff of the formula

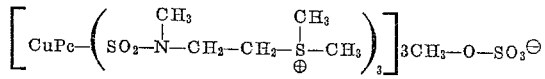

(prepared by the sulfochlorination of copper-phthalocyanine, reaction of the copper-phthalocyanine trisulfonic acid chloride so obtained with β-aminoethyl thiosulfuric acid, hydrolysis of the so prepared condensation product into the corresponding mercaptan and reaction with dimethyl sulfate); the fabric is then rinsed, boiled for 10 minutes in a tri-sodium phosphate solution of 3% strength, rinsed, acidified, rinsed again and dried.

An even turquoise blue dyeing, possessing a very good fastness to wet processing, is obtained.

If instead of the afore-mentioned dyestuff 0.3 part of the dyestuff of the formula

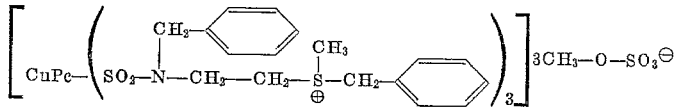

is used, a somewhat more greenish turquoise blue even dyeing, possessing good fastness properties, is obtained.

I claim:

A process for producing even dyeings on shaped articles of a material selected from the group consisting of natural and regenerated cellulose in a long bath, which consists of treating said shaped articles in a dilute weakly acid solution at a temperature between about 20° and 100°

C. with a water-soluble organic dyestuff selected from the group consisting of monoazo, disazo, metal-phthalocyanine and tetraphenyl-metal phthalocyanine dyestuffs free from anionic groups and containing at least one cationic radical selected from the group consisting of

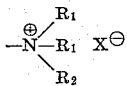

wherein $R_1$ represents a lower alkyl group, $R_2$ represents a member of the group consisting of a hydrogen atom, the benzyl group and a lower alkyl group and $X^\ominus$ represents an acid radical

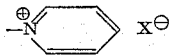

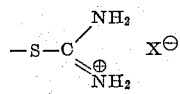

and

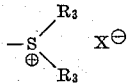

wherein $R_3$ represents lower alkyl groups and $X^\ominus$ is defined as above, which groups are linked to a carbon atom of an aromatic nucleus of the dyestuff molecule through a bridge member selected from the group consisting of

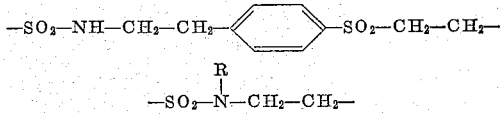

$$-SO_2-N-CH_2-CH_2-$$
       $|$
       $R$ wherein R represents a member of the group consisting of a hydrogen atom and an alkyl group, and $$-SO_2-CH_2-CH_2-$$

and fixing the dyeings so obtained by treating them with an acid binding agent in an aqueous bath at a temperature between 40° and 100° C.

References Cited by the Examiner
UNITED STATES PATENTS

| | | | |
|---|---|---|---|
| 3,044,843 | 7/62 | Tullio | 8—1.214 |
| 3,066,005 | 11/62 | Wedemeyer et al. | 8—54.2 |
| 3,088,790 | 5/63 | Schultheis et al. | 8—54.2 |
| 3,096,340 | 7/63 | Tartter et al. | 8—1.214 |
| 3,116,103 | 12/63 | Gamlen et al. | 8—54.2 X |

OTHER REFERENCES

Du Pont, Technical Information Bulletin R-26, May 1957, p. 15, under Drying.

S.V.F. Fachorgan, 17, October 1962, pp. 703–707.

NORMAN G. TORCHIN, *Primary Examiner.*